Patented May 13, 1952

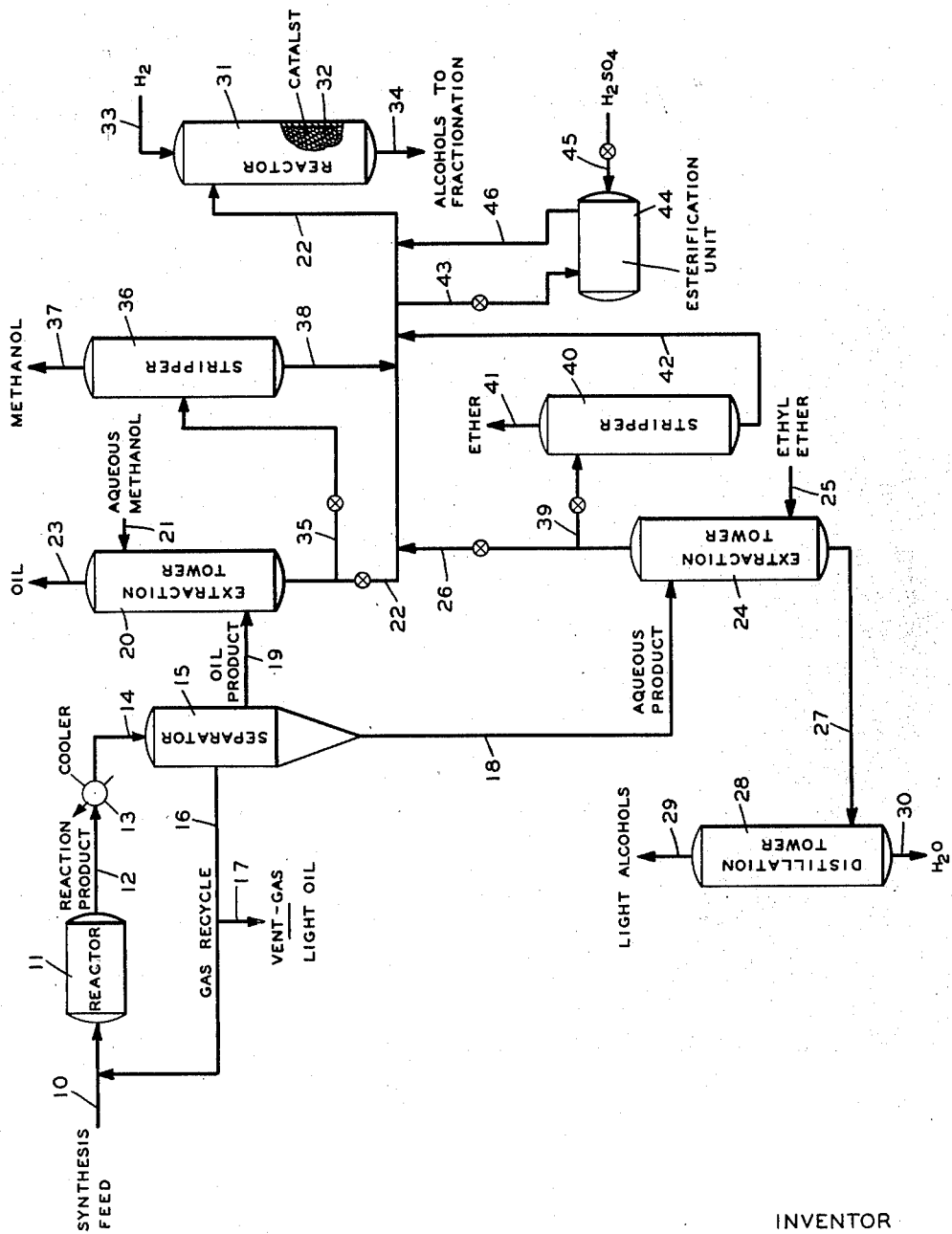

2,596,160

UNITED STATES PATENT OFFICE 2,596,160

SEPARATION OF ORGANIC COMPOUNDS

Henry G. McGrath, Elizabeth, N. J., assignor to The M. W. Kellogg Company, Jersey City, N. J., a corporation of Delaware Application January 30, 1948, Serial No. 5,333

20 Claims. (Cl. 260—450)

This invention relates to the separation of organic compounds and is a continuation-in-part of my prior and co-pending application, Serial No. 794,651 filed December 30, 1947. More particularly the invention relates to a method for the separation of oxygenated organic compounds, comprising alcohols, aldehydes, ketones, esters, and acids obtained as products in the catalytic hydrogenation of oxides of carbon. Still more particularly, the invention relates to a method for the separation of the above mentioned oxygenated compounds present in both a hydrocarbon-rich phase and a water-rich phase obtained from the condensation of the reaction product produced in the catalytic hydrogenation of oxides of carbon.

In the hydrogenation of oxides of carbon in the presence of a catalyst at elevated temperatures, mixtures of oxygenated organic compounds comprising alcohols, aldehydes, ketones, esters, and acids are obtained as reaction products in the vapor state, in the form of reactor outlet gases. These gases are generally passed through one or more condensation zones in which they are cooled to temperatures within the range from about 40° F. and about 150° F. The resulting condensate then separates into a hydrocarbon-rich phase and a water-rich phase, each phase containing the aforementioned oxygenated compounds. In treating the respective phases for the separation of these oxygenated compounds, it has been found highly desirable, from an economic standpoint, to convert the total chemicals to alcohols, thus simplifying their recovery, which otherwise would normally entail subjecting the total chemicals to a series of diversified treatments in order to obtain the separation of individual classes of oxygenated organic compounds present.

It is, therefore, an object of this invention to provide a method for the separation of oxygenated organic compounds present in the reaction product obtained in the catalytic hydrogenation of oxides of carbon.

Another object of the invention is to provide a method for the separation of oxygenated organic compounds present in the hydrocarbon-rich and water-rich phases obtained from the condensation of the reaction product produced in the catalytic hydrogenation of oxides of carbon.

Other object and advantages inherent in the invention will be apparent from the following more detailed disclosure.

In general, the process of the invention broadly comprises, first condensing the aforementioned reaction product and separating the resulting condensate into a hydrocarbon-rich phase and a water-rich phase, each containing a mixture of the aforementioned oxygenated organic compounds; next separately subjecting these phases to solvent extraction to separate oxygenated from non-oxygenated compounds, employing particular types of extraction media; and finally subjecting the combined oxygenated chemicals extracts to catalytic hydrogenation under particular hydrogenation conditions, as more fully hereinafter described, to convert the oxygenated compounds to alcohols. In another modification of the process of the invention, the aforementioned combined oxygenated chemicals extracts are esterified prior to hydrogenation, to convert organic acids and alcohols present to their corresponding esters in order to reduce the severity of the hydrogenation conditions in the subsequent hydrogenation step.

The accompanying drawing illustrates diagrammatically one form of the apparatus employed and capable of carrying out one embodiment of the process of the invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated. Some of the mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, a synthesis feed comprising a reaction mixture of hydrogen and an oxide of carbon, at varying mol ratios such as 2:1, is supplied through line 10 and transferred through this line to a synthesis reaction vessel, represented in the drawing by reactor 11. In reactor 11, the reaction mixture is contacted with a hydrogenation catalyst, such as a reduced iron or cobalt catalyst, at temperatures varying between about 300° F. and about 700° F. and at pressures varying between about atmospheric pressure and about 500 pounds per square inch, and is carried out according to conventional fixed-bed or fluid-bed operations. The resulting reaction product obtained from reactor 11 is withdrawn through line 12. This product is in the vapor form, substantially as it comes from the reactor within the aforementioned temperature range, containing water, hydrocarbons, and oxygenated organic compounds comprising aldehydes, ketones, esters, acids, and alcohols, and is first cooled to condense substantially large quantities of normally liquid components. Conveniently, condensation may be effected in a plurality of cooling stages which are represented diagrammatically in the drawing by cooler 13 with which line 12 connects. From cooler 13, the resulting mixture of condensate and uncondensed gases passes through line 14 to a separator 15. In the latter, uncondensed gases are withdrawn through line 16 and recycled through this line to the synthesis feed in line 10, with which line 16 connects. Vent-gas and uncondensed light oil may be withdrawn through line 17. The condensate in separator 15 separates as a lower aqueous phase and an upper oil phase. The aqueous phase is drawn off from the bottom of separator 15 through line 18, and the oil phase is drawn off at an intermediate point through line 19. It should be noted that apparatus embodying more than one separation stage may be employed if desired; for example, primary and secondary stages may be introduced, operating successively and respectively at temperatures of about 150° F. and about 100° F.

The oil product liquid phase withdrawn from separator 15 through line 19, comprises a hydrocarbon-rich mixture containing oxygenated organic compounds consisting of aldehydes, ketones, esters, acids, and alcohols. This oil product or a fractionated portion thereof boiling within the range from about 150° F. to about 400° F., is next subjected to extraction treatment with a substantially hydrocarbon-insoluble alcohol treating agent such as methanol, ethanol, or propanol, to extract the aforementioned oxygenated compounds from the oil, the particular alcohol treating agent selected having a boiling point lower than that of the oxygenated compounds subjected to extraction. For this purpose, the aforementioned hydrocarbon-rich mixture is transferred through line 19 to a low point in an extraction tower 20. In tower 20 the mixture introduced through line 19 is subjected to intimate countercurrent contact with one or more of the aforementioned hydrocarbon-insoluble alcohol treating agents, such as aqueous methanol, which is introduced into tower 20 through line 21. The methanol treating agent and the mixture of hydrocarbons and oxygenated organic compounds are contacted in tower 20 under conditions effective to absorb in the methanol substantially all of the oxygenated compounds present. The extract thus produced, comprising a mixture of the methanol treating agent and other oxygenated organic compounds, namely, aldehydes, ketones, esters, acids, and alcohols, is withdrawn from the bottom of tower 20 through valved-line 22 for further treatment in the process hereinafter described. The separated hydrocarbon or oil layer in tower 20 may be withdrawn overhead through line 23 for further use or treatment outside the scope of the present process.

The aqueous liquid phase withdrawn from separator 15 through line 18 comprises a water-rich mixture containing oxygenated organic compounds consisting of aldehydes, ketones, esters, acids, and alcohols. This aqueous product is next subjected to extraction treatment with a substantially water-insoluble organic solvent, such as a relatively low-boiling hydrocarbon or a water-insoluble oxygen-containing organic compound, such as a ketone, an ether, or an ester, to extract the aforementioned oxygenated compounds from their aqueous solution. For this purpose, the water-rich mixture is transferred through line 18 to an intermediate point in an extraction tower 24. In tower 24 the mixture introduced through line 18 is subjected to intimate countercurrent contact with a substantially water-insoluble solvent, such as a relatively low-boiling hydrocarbon which may contain from 3 to 5 carbon atoms per molecule, for example, propane, butane, or pentane, or a water-insoluble oxygen-containing solvent, for example, a ketone, an ether, or an ester. Ketones such as methyl isobutyl ketone, methyl ethyl ketone, or methyl propyl ketone may be employed. In addition esters may likewise be employed, such as ethyl acetate, or butyl acetate.

Ethers may be also employed such as ethyl ether, isopropyl ether or butyl ether. Ethyl ether, being preferred in the present embodiment of the process of the invention, in introduced at a low point in tower 24 through line 25. The ether treating agent and the water-rich mixtures of oxygenated organic compounds are contacted in tower 24 under conditions effective to absorb in the treating agent substantially all of the oxygenated organic compounds present. The extract thus produced, comprising a mixture of the ether treating agent and the aforementioned oxygenated compounds, namely, aldehydes, ketones, esters, acids, and alcohols, is withdrawn overhead from tower 24 through valved-line 26 for further treatment in the process hereinafter described. Bottoms from tower 24, comprising substantially water and unextracted light alcohols, are withdrawn and transferred through line 27 to a distillation tower 28. Tower 28 is operated under conditions of temperature and pressure effective to distill overhead the aforementioned light alcohols, substantially water-free, which are withdrawn through line 29 for further use or treatment outside the scope of the present process. Remaining quantities of water in tower 28 are withdrawn as bottoms through line 30.

As indicated above, the extract phase from tower 20, comprising a mixture of the methanol treating agent and the aforementioned oxygenated organic compounds, is withdrawn through line 22, while the extract from tower 24 also comprising a mixture of oxygenated organic compounds and the ether treating agent, is withdrawn through line 26. These extracts are next subjected to hydrogenation in order to convert non-alcoholic oxygenated organic compounds to alcohols. For this purpose, the extract phase from tower 20 withdrawn through line 22 may be transferred through this line to a hydrogenation reactor 31. Similarly, the extract phase from tower 24 withdrawn through line 26 may be transferred via line 22, with which line 26 connects, into reactor 31. In reactor 31 the combined liquid extract phases are subjected to hydrogenation at temperatures varying between about 230° C. and about 270° C., and at pressures varying between about 2900 and about 3700 pounds per square inch absolute, in the presence of at least one hydrogenation catalyst, (shown in the drawing by a broken section represented by reference numeral 32), preferably one or more hydrogenation catalysts comprising metals having an atomic number greater than 23, in order to convert the aforementioned aldehydes, ketones, esters, and acids to alcohols. Such hydrogenation catalysts may comprise copper, chromium oxide, copper chromite, zinc oxide, zinc chromite, nickel, ruthenium, molybdenum, silver, platinum, cobalt, or iron. Hydrogen employed in reactor 31 is introduced through line 33.

The effluent from reactor 31 comprises a mixture of alcohols and also contains varying quantities of the respective treating agents introduced into towers 20 and 24. This mixture is withdrawn through line 34 and may be subjected to further treatment for the separation of individual alcohols, outside the scope of the present process. However, it may be desirable to recover the respective treating agents from the extracts withdrawn from towers 20 and 24, prior to the aforementioned hydrogenation step in order to obtain a mixture of alcohols, substantially free of the aforementioned treating agents in the effluent which is withdrawn from reactor 31 through line 34 and also to effect a saving in the cost of extra vaporization and condensation which would otherwise be necessary if the aforementioned treating agents were not removed prior to hydrogenation. In such event the extract from tower 20, withdrawn through line 22 and comprising a mixture of the aforementioned methanol treating agent and other oxygenated organic compounds, may be transferred from line 22 via valved-line 35 to a stripper 36. Stripper 36 is operated under conditions of temperature and pressure effective to distill overhead the methanol treating agent which is withdrawn through line 37. Bottoms from stripper 36, comprising a mixture of the aforementioned oxygenated compounds, methanol-free, are withdrawn through line 38 and may be transferred into line 22 with which line 38 connects, for further treatment in reactor 31 in the process hereinabove described.

Similarly, the water-insoluble treating agent, namely ethyl ether, present in the extract withdrawn from tower 24 through line 26 may be recovered prior to hydrogenation of non-alcoholic compounds contained in the extract. Accordingly, this extract may be transferred from line 26 into valved-line 39, to a stripper 40. Stripper 40 is operated under conditions of temperature and pressure effective to distill overhead the ethyl ether treating agent which is withdrawn through line 41. Bottoms from stripper 40, comprising a mixture of the aforementioned oxygenated compounds free of ethyl ether, are withdrawn through line 42 and may be transferred into line 22, and thus combined with the bottoms from stripper 36 for further treatment in reactor 31 in the process hereinbefore described.

In order to reduce the severity of the hydrogenation conditions in converting non-alcoholic oxygenated compounds to alcohols in reactor 31, it may be desirable, according to another modification of the process of the invention, to convert organic acids and alcohols present in the combined extracts in line 22 to their corresponding esters, irrespective of whether the combined streams entering reactor 31 contain any quantities of the aforementioned treating agents introduced into towers 20 and 24. For this purpose the combined stream of oxygenated organic compounds in line 22 may be transferred through valved-line 43 into any suitable conventional esterification apparatus, represented in the drawing by esterification unit 44. In esterification unit 44 organic acids and alcohols present in the mixture of oxygenated organic compounds introduced through line 43, are brought into intimate contact to form the corresponding esters of the respective acids and alcohols present. As is well-known to those skilled in the art, where the aforementioned acids and alcohols are present in a substantially anhydrous state, substantially complete esterification will take place in unit 44. However, where appreciable quantities of water are present in unit 44 the latter may be removed by introducing a dehydrating agent, such as a mineral acid, which may be sulfuric acids or phosphoric acid, which acts as a catalyst in the esterification step and which is transferred into unit 44 through valved-line 45. The resulting effluent from unit 44, comprising a mixture of aldehydes, ketones, and esters is transferred through line 46 via line 22, with which line 46 connects, into reactor 31 for further treatment in the process hereinbefore described. In this respect it should be noted that where the esterification step is employed, the aforementioned stripping of the methanol heating agent in stripper 36 may be eliminated and the extract from tower 20 passed directly into reactor 31 through line 22.

The following specific example will serve to illustrate but is not intended in any way to limit unduly the broad scope of the invention.

*Example*

A mixture of oxygenated compounds obtained as combined extracts from the solvent extraction of the hydrocarbon-rich phase and the water-rich phase produced in the catalytic hydrogenation of carbon monoxide, (employing an alkalized iron catalyst) is found to have the following composition:

|  | Mol percent |
|---|---|
| Alcohols | 51 |
| Aldehydes | 6 |
| Ketones | 3 |
| Esters | 5 |
| Acids | 35 |
| Total | 100 |

This mixture is next reacted with excess hydrogen in the presence of a copper catalyst at a pressure of 3500 pounds per square inch absolute and at a temperature of 260° C. Upon subsequent analysis, the reaction product is found to be completely alcoholic, all acids, esters, ketones and aldehydes having been reduced to alcohols.

Having thus described my invention, what I claim and desire to secure by Letters Patent is:

1. In a process for the catalytic hydrogenation of an oxide of carbon in which are obtained a hydrocarbon-rich phase and a water-rich phase and in which each phase contains oxygenated organic compounds selected from the group consisting of aldehydes, ketones, esters, acids and their mixtures, the method of producing alcohols from said phases which comprises the steps of separately subjecting said hydrocarbon-rich phase to extraction treatment with a substantially hydrocarbon-insoluble alcohol to obtain an extract containing a mixture of said oxygenated compounds, separately subjecting said water-rich phase to extraction treatment with a substantially water-insoluble organic compound to obtain an extract containing a mixture of said oxygenated compounds, combining said extracts, and subjecting said combined extracts to hydrogenation at a temperature between about 230° C. and about 270° C. and at a pressure between about 2900 and about 3700 pounds per square inch absolute in the presence of a hydrogenation catalyst to convert said oxygenated compounds to alcohols.

2. A method in accordance with claim 1 wherein said water-insoluble organic compound is a hydrocarbon.

3. A method in accordance with claim 1 wherein said water-insoluble organic compound is a hydrocarbon having from 3 to 5 carbon atoms per molecule.

4. A method in accordance with claim 3 wherein said hydrocarbon is pentane.

5. A method in accordance with claim 1 wherein said alcohol is methanol.

6. A method in accordance with claim 1 wherein said alcohol is ethanol.

7. A method in accordance with claim 1 wherein said alcohol is propanol.

8. A method in accordance with claim 1 wherein said water-insoluble organic compound is an ether.

9. A method in accordance with claim 1 wherein said water-insoluble organic compound is ethyl ether.

10. A method in accordance with claim 1 wherein said water-insoluble organic compound is a ketone.

11. A method in accordance with claim 1 wherein said water-insoluble organic compound is methyl isobutyl ketone.

12. A method in accordance with claim 1 wherein said water-insoluble organic compound is an ester.

13. A method in accordance with claim 1 wherein said water-insoluble organic compound is ethyl acetate.

14. A method in accordance with claim 1 wherein said last-mentioned catalyst comprises copper.

15. A method in accordance with claim 1 wherein said last-mentioned catalyst comprises iron.

16. A method in accordance with claim 1 wherein said last-mentioned catalyst comprises nickel.

17. In a process for the catalytic hydrogenation of an oxide of carbon in which are obtained a hydrocarbon-rich phase and a water-rich phase and in which each phase contains oxygenated organic compounds selected from the group consisting of aldehydes, ketones, esters, acids and their mixtures, the method of producing alcohols from said phases which comprises the steps of separately subjecting said hydrocarbon-rich phase to extraction treatment with methanol to obtain an extract containing a mixture of said oxygenated compounds, separately subjecting said water-rich phase to extraction treatment with ethyl ether to obtain an extract containing a mixture of said oxygenated compounds, combining said extracts, and subjecting said combined extracts to hydrogenation at a temperature between about 230° C. and about 270° C. and at a pressure between about 2900 and about 3700 pounds per square inch absolute in the presence of a hydrogenation catalyst comprising copper to convert said oxygenated compounds to alcohols.

18. In a process for the catalytic hydrogenation of an oxide of carbon in which are obtained a hydrocarbon-rich phase and a water-rich phase and in which each phase contains oxygenated organic compounds selected from the group consisting of aldehydes, ketones, esters, acids and their mixtures, the method of producing alcohols from said phases which comprises the steps of separately subjecting said hydrocarbon-rich phase to extraction treatment with methanol to obtain an extract containing a mixture of said oxygenated compounds, separating methanol from said extract, separately subjecting said water-rich phase to extraction treatment with ethylether to obtain an extract containing a mixture of said oxygenated compounds, separating ethylether from said last-mentioned extract, combining said extracts after removal of solvent therefrom, and subjecting said combined extracts to hydrogenation to convert said oxygenated compounds to alcohols.

19. In a process for the catalytic hydrogenation of an oxide of carbon in which are obtained a hydrocarbon-rich phase and a water-rich phase and in which each phase contains oxygenated organic compounds selected from the group consisting of aldehydes, ketones, esters, acids and their mixtures, the method of producing alcohols from said phases which comprises the steps of separately subjecting said hydrocarbon-rich phase to extraction treatment with a substantially hydrocarbon-insoluble alcohol to obtain an extract containing a mixture of said oxygenated compounds, separating solvent from said extract, separately subjecting said water-rich phase to extraction treatment with a substantially water-insoluble organic compound to obtain an extract containing a mixture of said oxygenated compounds, separating solvent from said last-mentioned extract, combining said extracts after removal of solvent therefrom, and subjecting said combined extracts to hydrogenation to convert said oxygenated compounds to alcohols.

20. In a process for the catalytic hydrogenation of an oxide of carbon in which are obtained a hydrocarbon-rich phase and a water-rich phase and in which each phase contains oxygenated organic compounds selected from the group consisting of aldehydes, ketones, esters, acids and their mixtures, the method of producing alcohols from said phases which comprises the steps of separately subjecting said hydrocarbon-rich phase to extraction treatment with a substantially hydrocarbon-insoluble alcohol to obtain an extract containing a mixture of said oxygenated compounds, separately subjecting said water-rich phase to extraction treatment with a substantially water-insoluble organic compound to obtain an extract containing a mixture of said oxygenated compounds, combining said extracts, and subjecting said combined extracts to hydrogenation to convert said oxygenated compounds to alcohols.

HENRY G. McGRATH.

REFERENCES CITED

The following references are of record in the file of this patent:

UNITED STATES PATENTS

| Number | Name | Date |
|---|---|---|
| 1,684,640 | Schmidt | Sept. 18, 1928 |
| 1,782,963 | James | Nov. 26, 1930 |
| 1,870,816 | Lewis | Aug. 9, 1932 |
| 1,921,381 | Beller | Aug. 8, 1933 |
| 1,979,841 | Pier | Nov. 6, 1934 |
| 2,002,533 | Frolich | May 28, 1935 |
| 2,048,662 | Luther | July 21, 1936 |
| 2,083,125 | Scheuble | June 8, 1937 |
| 2,171,324 | Zetzsche | Aug. 29, 1939 |
| 2,248,099 | Linckh | July 8, 1941 |
| 2,274,750 | Soenken | Mar. 3, 1942 |
| 2,322,097 | Schmidt | June 15, 1943 |
| 2,417,164 | Huber | Mar. 11, 1947 |